US007920065B2

United States Patent
Light et al.

(10) Patent No.: US 7,920,065 B2
(45) Date of Patent: Apr. 5, 2011

(54) SYSTEM AND METHOD FOR PROVIDING VISUAL AND PHYSIOLOGICAL CUES IN A MATCHING SYSTEM

(75) Inventors: Elliott D. Light, Rockville, MD (US); Jon L. Roberts, Great Falls, VA (US)

(73) Assignee: C.H.I. Development Mgmt. Ltd. VII, LLC, Wilmington, DE (US)

( * ) Notice: Subject to any disclaimer, the term of this patent is extended or adjusted under 35 U.S.C. 154(b) by 0 days.

(21) Appl. No.: 12/875,819

(22) Filed: Sep. 3, 2010

(65) Prior Publication Data

US 2010/0328078 A1 Dec. 30, 2010

Related U.S. Application Data

(60) Division of application No. 12/418,134, filed on Apr. 3, 2009, now Pat. No. 7,800,507, which is a continuation of application No. 12/146,517, filed on Jun. 26, 2008, now Pat. No. 7,528,729, which is a continuation of application No. 12/031,804, filed on Feb. 15, 2008, now Pat. No. 7,394,388, which is a continuation of application No. 11/844,776, filed on Aug. 24, 2007, now Pat. No. 7,342,503.

(51) Int. Cl.
*G08B 23/00* (2006.01)

(52) U.S. Cl. ............... 340/573.1; 340/539.1; 340/572.1; 455/403

(58) Field of Classification Search ............... 340/573.1, 340/572.1, 539.1; 455/403
See application file for complete search history.

(56) References Cited

U.S. PATENT DOCUMENTS

| 6,491,217 B2 | 12/2002 | Catan |
| 6,618,593 B1 | 9/2003 | Drutman |
| 6,664,891 B2 | 12/2003 | Davies et al. |
| 6,690,918 B2 | 2/2004 | Evans et al. |

(Continued)

FOREIGN PATENT DOCUMENTS

DE 10357305 7/2005

OTHER PUBLICATIONS

Mnoon, comment in CNET Reviews, (2 pp. downloaded from Google.com, May 16, 2005).

(Continued)

*Primary Examiner* — Travis R Hunnings
(74) *Attorney, Agent, or Firm* — Fitch Even Tabin & Flannery

(57) ABSTRACT

A portable matching device and method is provided. The portable matching device includes a memory that is configured to store first identification information. A communication device in the portable matching device is configured to transmit the first identification information from the memory to a presence detector and to receive a matching attribute from a server, which is configured to determine whether a first profile associated with the first identification information and a second profile match according to matching criteria. The portable matching device further includes a match indicator that is configured to present the matching attribute, which is unique to the second profile and is presented by the match indicator so as to be at least one of outwardly visible or audible so as to be information to a person other than a user of the matching device of the match.

20 Claims, 7 Drawing Sheets

U.S. PATENT DOCUMENTS

| | | |
|---|---|---|
| 6,711,414 B1 | 3/2004 | Lightman et al. |
| 6,757,719 B1 | 6/2004 | Lightman et al. |
| 6,758,397 B2 | 7/2004 | Catan |
| 6,892,066 B2 | 5/2005 | Detweiler et al. |
| 6,961,000 B2 | 11/2005 | Chung |
| 6,977,612 B1 | 12/2005 | Bennet |
| 6,992,574 B2 | 1/2006 | Aupperle et al. |
| 6,996,402 B2 | 2/2006 | Logan |
| 7,092,002 B2 | 8/2006 | Ferren et al. |
| 7,098,793 B2 | 8/2006 | Chung |
| 7,206,568 B2 | 4/2007 | Sudit |
| 7,216,109 B1 | 5/2007 | Donner |
| 7,280,822 B2 | 10/2007 | Fraccaroli |
| 7,310,676 B2 | 12/2007 | Bourne |
| 7,342,503 B1 | 3/2008 | Light et al. |
| 7,394,388 B1 | 7/2008 | Light et al. |
| 7,424,541 B2 | 9/2008 | Bourne |
| 7,528,729 B2 | 5/2009 | Light et al. |
| 2004/0120298 A1* | 6/2004 | Evans et al. .................. 370/338 |
| 2005/0174975 A1* | 8/2005 | Mgrdechian et al. ......... 370/338 |
| 2005/0177614 A1* | 8/2005 | Bourne ......................... 709/200 |
| 2005/0272413 A1* | 12/2005 | Bourne ......................... 455/415 |
| 2005/0282530 A1* | 12/2005 | Raff .............................. 455/418 |
| 2006/0085419 A1 | 4/2006 | Rosen |
| 2006/0109083 A1* | 5/2006 | Rathus et al. ................ 340/10.1 |
| 2006/0256959 A1 | 11/2006 | Hymes |
| 2007/0030824 A1 | 2/2007 | Ribaudo et al. |
| 2007/0032240 A1 | 2/2007 | Finnegan et al. |
| 2007/0096909 A1 | 5/2007 | Lally |
| 2009/0195380 A1 | 8/2009 | Light et al. |

OTHER PUBLICATIONS

McCarthy, J.; McDonald, D.; Soroczak, S.; Nguyen, D.; Rashid, A: "Augmenting the Social Space of an Academic Conference," (10 pp. downloaded from Google.com, Nov. 2004).

* cited by examiner

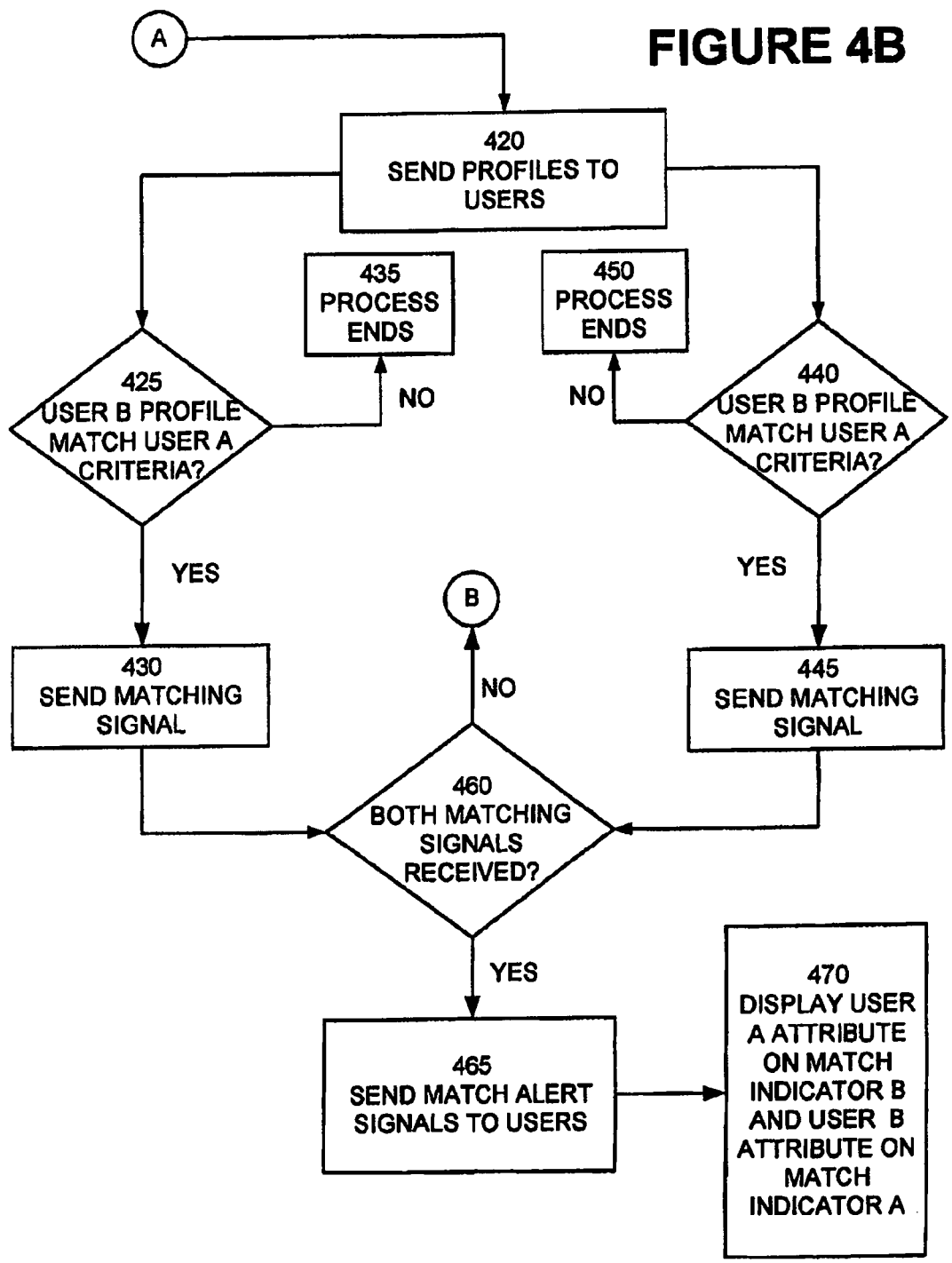

SYSTEM AND METHOD FOR PROVIDING VISUAL AND PHYSIOLOGICAL CUES IN A MATCHING SYSTEM

CROSS-REFERENCE TO RELATED APPLICATIONS

This application is a divisional application of U.S. application Ser. No. 12/418,134, filed Apr. 3, 2009, which is a continuation application of U.S. application Ser. No. 12/146,517, filed Jun. 26, 2008, now U.S. Pat. No. 7,528,729, which is a continuation application of U.S. application Ser. No. 12/031,804, filed Feb. 15, 2008, now U.S. Pat. No. 7,394,388, which is a continuation application of U.S. application Ser. No. 11/844,776, filed Aug. 24, 2007, now U.S. Pat. No. 7,342,503, each of which are incorporated by reference herein for all purposes.

BACKGROUND AND SUMMARY

Conceptually, the world can be divided into those with needs and/or desires and people with potential means of satisfying those needs and/or desires. For example, a salesperson may be seeking potential clients. A single person may be seeking a dating partner. A guitar player may be seeking a drummer. A shopper may be looking for a particular item to buy. The difficulty has been in bringing the seekers into close proximity and in providing them sufficient information to allow them to decide if their interests coincide.

Solutions to this problem are sometimes referred to as matching systems and involve varying mechanisms for assessing whether a profile of the problem owner and a profile of a solution owner "match" sufficiently to provide information to at least one of the parties about the other. For example, RFID, GPS, and Bluetooth technology has been proposed to identify individuals with related interests when they are in proximity to each other. If the individuals are sufficiently close to each other, various systems have been combined with profile records to determine if the individuals have interests that "match" and, if so, to facilitate the exchange of location information between the individuals. Ad hoc wireless networks have also been described that facilitate such an exchange. Reference is made to U.S. Pat. Nos. 6,711,414 and 6,757,719 to Lightman et al., 6,977,612 to Bennet, 6,996,402 to Logan, 6,618,593 to Drutman, 6,419,217 and 6,758,397 to Catan, 7,098,793 and 6,961,000 both to Chung, 6,992,574 to Aupperle et al., and 7,092,002 to Ferren et al., U.S. Patent Application 2005/0174975 filed by Mgrdechian et al., U.S. Patent Application 2007/0030824 filed by Ribaudo et al., U.S. Patent Application 2006/0256959 filed by Hymes, U.S. Patent Application 2007/0096909 filed by Lally, and U.S. Patent Applications 2005/0177614 and 2005/0272413 filed by Bourne, all of which are incorporated herein by reference for all purposes.

These solutions are generally directed to providing information to individuals having matching profiles. However well designed, such matching systems cannot account for the importance of visual cues and other physiological indicators in determining whether to interact with another person, whether it is for social or business purposes.

What would be useful is an information exchange system that provides visual and physiological cues to users.

In an embodiment, a first user monitor is configured to transmit a first response signal comprising first identification information to a presence detector establishing a presence of the first user monitor within a defined space. A second user monitor is configured to transmit a second response signal comprising second identification information to the presence detector establishing a presence of the second user monitor within the defined space. An interrogator is configured to receive the identification information from the first and second user monitors and to send the identification information to an information server.

In this embodiment, the information server is configured to store a first user profile comprising information associated with a user of the first user monitor and a second user profile comprising information associated with a user of the second user monitor and to receive the information establishing the presence of the first and the second user monitors. If the first and second user monitors are present, the information server is configured to determine whether the first and the second user profiles match according to matching criteria.

If the first and the second user profiles match according to the matching criteria, then send a first matching alert signal comprising a first matching attribute to a first match indicator and a second matching alert signal comprising a second matching attribute to a second match indicator. The first matching attribute is displayed on the first match indicator, wherein the first match indicator is visible to the user of the second user monitor so as to be informative to the user of the second user monitor of the matching of the first and second user profiles according to the matching criteria. The second matching attribute is displayed on the second match indicator, wherein the second match indicator is visible to the user of the first user monitor so as to be informative to the user of the first user monitor of the matching of the first and second user profiles according to the matching criteria. In an embodiment, the first matching attribute is unique to the user of the second user monitor and the second matching attribute is unique to the user of the first user monitor.

By way of illustration and not as a limitation, the user monitor may be an RFID enabled device, a Bluetooth enabled device, a GPS enabled device, and a Wi-Fi enabled device.

By way of illustration and not as a limitation, the first and second matching attributes are selected from the group consisting of a background color, a background hue, a display color, a display hue, a symbol, text, animation, and an animation rate.

In another embodiment, the information server receives physiological data of the user of the first user monitor from a sensor. A bio response processor located in the first user monitor is configured to receive the physiological data from the sensor, determine a measure of attraction of the user of the first user monitor to the user of the second user monitor from at least one element of the physiological data and create an attraction attribute indicative of the attraction measure. The bio response processor then sends an attraction signal to the first match indicator comprising the attraction attribute. The first match indicator displays the attraction attribute so as to be informative of the attraction of the user of the first user monitor to the user of the second user monitor.

In yet another embodiment, the information server receives physiological data of the user of the first user monitor from a sensor. A bio response processor located in the first user monitor is configured to receive the physiological data from the sensor, determine a measure of truthfulness of the user of the first user monitor to the user of the second user monitor from at least one element of the physiological data and create a truthfulness attribute indicative of the truthfulness measure. The bio response processor then sends a truthfulness signal to the first match indicator comprising the truthfulness attribute. The first match indicator displays the truthfulness attribute so as to be informative of the truthfulness of the user of the first user monitor to the user of the second user monitor.

In another embodiment, the information server receives profile information and physiological data from at least one of the plurality of users. The information server determines a measure of truthfulness of the user relating to the profile information from at least one element of the physiological data. The information server then determines whether the measure of truthfulness is equal to or greater than a minimum threshold value. If the measure of truthfulness is equal to or greater than a minimum threshold value, the profile information is stored. If the measure of truthfulness is less than the minimum threshold value, then the profile information is rejected.

By way of illustration and not as a limitation, the physiological data are selected from the group consisting of a heart rate, a measure of blood pressure, a measure of breathing rate, a measure of skin resistance, a measure of body temperature, a voice pattern, and a measure of brain electrical activity.

DESCRIPTION OF THE DRAWINGS

FIGS. 4A and 4B illustrate a matching process according to an embodiment.

DETAILED DESCRIPTION

Figure 1:
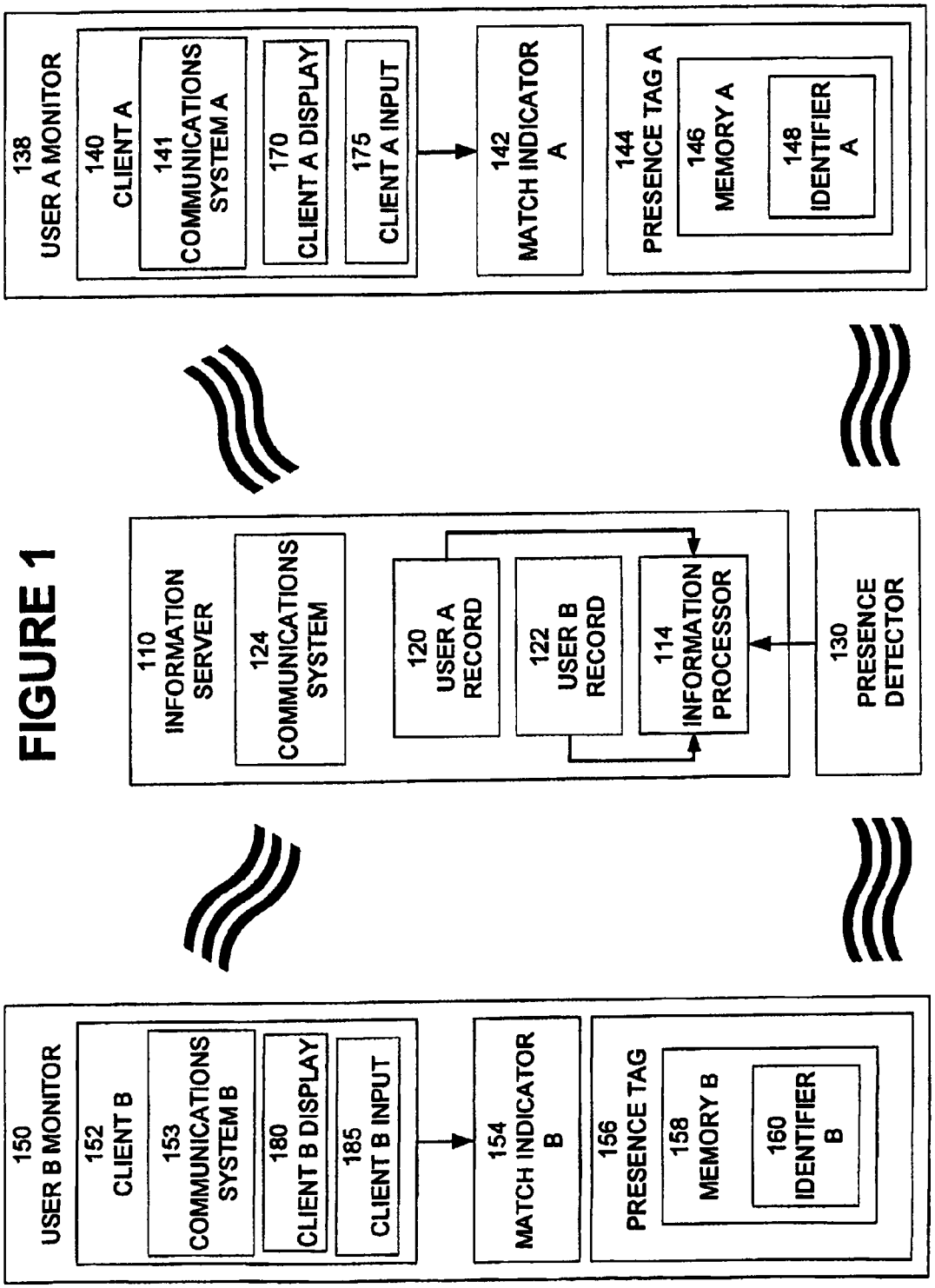
FIG. 1 illustrates the logical elements of a matching system according to an embodiment hereof.

FIG. 1 illustrates the logical elements of a matching system according to an embodiment hereof Referring to FIG. 1, an information server 110 interacts with users A and B, each possessing RFID monitors 138 and 150 respectively. Information server 110 comprises a processor 114, a user A record 120 and a user B record 122. User A monitor 138 comprises presence tag A 144, client A 140, communications system A 141, and match indicator A 142. Presence tag A 144 comprises memory 146 in which identifier A 148 is stored. Memory 146 may be read only or programmable read/write memory. User A is associated with identifier A 148 in user A record 120 in information server 110. Additionally, information server 110 comprises a communications system 124 for communicating with clients A and B (140 and 152 respectively).

User B monitor 150 comprises presence tag B 156, client B 152, communications system B 153, and match indicator B 154. Presence tag B 156 comprises memory B 158 in which identifier B 160 is stored. Memory 158 may be read only or programmable read/write memory. User B is associated with identifier B 160 in user B record 122 in information server 110.

In the embodiment illustrated in FIG. 1, presence tags A and B (144 and 156 respectively) are passive devices. By way of illustration and not as a limitation, RFID tags and RFID enabled devices may be used to perform the functions of the presence tags. However, the present invention is not so limited. Semi-passive or active presence tags may be utilized for presence tags A and B. While RFID tags are suitable in present-day technology, embodiments should not be construed to be limited to this particular technology. What is anticipated are objects that can be worn that perform the functions as noted herein. By way of illustration and not as a limitation, Bluetooth-enabled devices, GPS-enabled devices, and Wi-Fi enabled devices may also be used to perform the functions of the presence tags.

User records A and B (120 and 122 respectively) each comprise a user profile. By way of illustration and not as a limitation, a user profile comprises characteristic data and preference data. The characteristic data may include age, marital status, physical size, physical limitations, and similar personal information. Preference data, for example, may include information relevant to establishing a business relationship or a social relationship and information related to preferences in food, clothing, sports, entertainment, and music. Thus information about the user and information concerning the user's preference for others are part of the user's profile.

User profile data may be collected from a user via a computer, a telephone, or via a personal interview. In an embodiment, a user is interviewed and the voice of the user is processed by a voice pattern recognition algorithm to determine whether the answers given by the user are truthful. Detection of stress in a voice pattern algorithm may indicate that a user is lying or that the particular response is a subject of stress for the user that requires further exploration via questions or perhaps human interaction. Users that are not truthful or who may not be able to complete a questionnaire without a stress reaction are not allowed into the system. As will be appreciated by those skilled in the art, other methods of determining the truthfulness or stress of a user may be used as well.

Presence detector 130 receives a presence signal from a presence tag (such as 144 and 156) that is within range of the presence detector 130. A presence signal received by presence detector 130 comprises the presence tag identifier of the responding presence tag (such as 148 and 160). The presence detector receives the presence signal and sends the presence tag identifier and other signal parameters such as strength to information processor 114. Information processor 114 stores the location of the presence detector 130 in association with the presence tag identifier in the appropriate user record (such as 120 or 122).

The presence signal may be further processed to determine a physical distance between a presence tag (such as 148 and 160) and the presence detector 130. In an embodiment, information processor 114 uses the signal strength of the presence signal to determine a separation distance between the presence detector 130 and any given presence tag 148, 156. The distance determination may be refined by varying the power of the query signal transmitted by the presence detector 130 and/or varying the sensitivity of the presence detector 130 to the presence signal. In this way, the accuracy of the location of a particular user relative to an array of presence detectors may be varied to suit a particular need.

The information server 110 communicates with clients A and B (140 and 152 respectively) via links established between communications system A 141, communications system B 153, and communications system 124. By way of illustration and not as a limitation, a client may be a standalone device or it may be a communications device such as a cellular phone, a pager, a personal data assistant, a transponder, a radio, a walkie-talkie, or a wireless Internet access device. Clients A and B (140 and 152 respectively) may also communicate with information server 110 to manage their respective user records, including the user profile. In an embodiment, information server 110 stores the user profile locally.

Client A further comprises a client A display 170 and a client A user input 175. Client B further comprises a client B display 180 and a client B user input 185. Client A display 170 and client B display 180 may display messages from information server 110. Client A user input 175 and client B user input 185 allow clients A and B respectively to compose queries and respond to queries from information server 110. By way of illustration and not as a limitation, client A user input 175 and client B user input 185 may be touch screens, key pads, pointing devices, thumbwheels or similar input devices.

In an embodiment, information processor 114 comprises a set of "default" instructions that determine how the profile information of user A and user B as reflected in user A record 120 and user B record 122 is to be related or "matched." For example, the default matching instructions may require that a match will be determined only if the age difference between user A and user B is ten years or less. Other more complex matches are within the scope of the various embodiments and may be multi-dimensional in nature leading to a "score" related to compatibility of the match.

In an embodiment, when a determination is made that matching scores of users A and B are within an acceptable range or exceed a predetermined threshold, a match alert signal is sent from the information server 110 via communication system 124 to the clients 140 and 152 of users A and B. As will be appreciated by those skilled in the art, the match alert signal may comprise audio information, video information, textual information, or graphical information. Additionally, the match alert signal may provide location information of a user where a "match" is present or provide directions to the location of a user with whom a "match" exists.

In an embodiment, the match alert signal is passed by the client A 140 to a match indicator A 142 worn by user A and by client 152 to match indicator 154. The match indicator A 142 is visible to user B. User B wears match indicator B 154 that is visible to user A. When user A and user B come within proximity to each other, match indicators A and B (142 and 154 respectively) are illuminated in a manner that indicates that users A and B have been matched by information processor 114. Additionally, client A display 170 and client B display 180 may be illuminated in a characteristic manner indicative of a match. Other embodiments may also indicate the strength of the match that is detected by the information processor 114.

In another embodiment, each user is assigned a display attribute. The match alert signal that is sent to user A comprises the display attribute that is assigned to user B. The match alert signal that is sent to user B comprises the display attribute that is assigned to user A. When user A and user B come within proximity to each other, and provided that their respective profiles have been determined to match, match indicators A and B (142 and 154 respectively) display the display attribute that has been previously assigned to the other user. By way of illustration, user A may be assigned the symbol A in a red background and user B may be assigned the symbol B in a blue background. When user A and user 13 are in proximity to each other, if the profiles of user A and B match, the match indicator of user A would display a B in a blue background and the match indicator of user B would display an A in a red background. The display attribute sent to user A may also be displayed on client A display 170 and the display attribute sent to user B may also be displayed on client B display 180.

In an embodiment, client 140 "announces" the matching attribute of user A to user B and the matching attribute of user B to user A. The announcement may be made by a text message or a synthesized voice message or other manner that alerts the respective users. In yet another embodiment, the language of the synthesized voice message may be selected by the user.

The default matching instructions may be modified by a preference setting in a user profile stored in the user's user record 120, 122. For example, if user B's profile requires that the age difference not exceed two years, the default matching instructions will be modified to use the age criterion of user B's profile.

In an embodiment, a "match" between the profiles of user A and user B is quantitatively determined. In this embodiment, the default matching instructions produce a total matching score by assigning values to specific matching criteria. The default matching criteria and the weight assigned to a specific criterion may be modified by the user in establishing the user records 120, 122. If the matching score exceeds a threshold value or is within an acceptable range, the matching score is communicated to users A and B through their respective clients (140 and 152 respectively) via communications system 124. The user may use the client (140 and 152 respectively) to request additional information from the information server 110 regarding the matching score and/or override the matching determination made by the information server 110.

In circumstances where the default matching instructions have been modified by a user, or where the match is determined quantitatively, the display attribute may comprise an intensity, hue or saturation component that is indicative of the degree of the match. For example, a color, hue and saturation level are assigned to users A and B as a matching attribute. The matching attribute will display the color having a hue and saturation depending on the level of matching of the users as determined by the information processor 114. The matching attribute values may be different for users A and B depending on whether one or both of the users' profiles have matching instructions or if either or both users determine the matching value at their respective clients. Thus user A's match indicator may inform user B that user A is a match (color) but qualitatively low in terms of scoring (hue and saturation). User B's match indicator may inform user A that user B is a qualitatively good match.

Additionally, when a user is in proximity to two potential matches, only the match indicator of the "best" match will display the display attribute of user A. Thus, in a defined space of many users, display indicators provide a visual cue of a level of commonality between individuals.

In an embodiment, the information server also tracks the matching attribute assigned to users located in an area of the defined space to minimize duplication of the matching attribute.

In another embodiment, the user profile and user matching instructions are stored in the client 140. User matching instructions are configured by the user to meet specific requirements of that user. The information processor 114 determines that users A and B are within a defined space and uses the default matching instructions to determine whether the profiles of users A and B match based on a set of first matching criteria. If the profiles match according to these criteria, the profile of user A is sent to the client 152 of user B and the profile of user B is sent to the client 140 of user A. User A applies user A matching instructions to the profile of user B. If a match is determined according to the matching instructions of user A, user A uses client A 140 to send a user A matching signal to information processor 114. If a match is determined according to the matching instructions of user B, user B uses client B 152 to send a user B matching signal to information processor 114.

If information processor 114 receives both the user A matching signal and the user B matching signal, the information processor 114 issues a match alert signal comprising location and/or contact information to facilitate a meeting between user A and user B. The match alert signal may also include display attributes of each user as previously described.

Alternatively, if information processor 114 receives both the user A matching signal and the user B matching signal, the match alert signal sent by information processor 114 includes only contact information to the users. The users then communicate further without the assistance of the information server.

Figure 5:
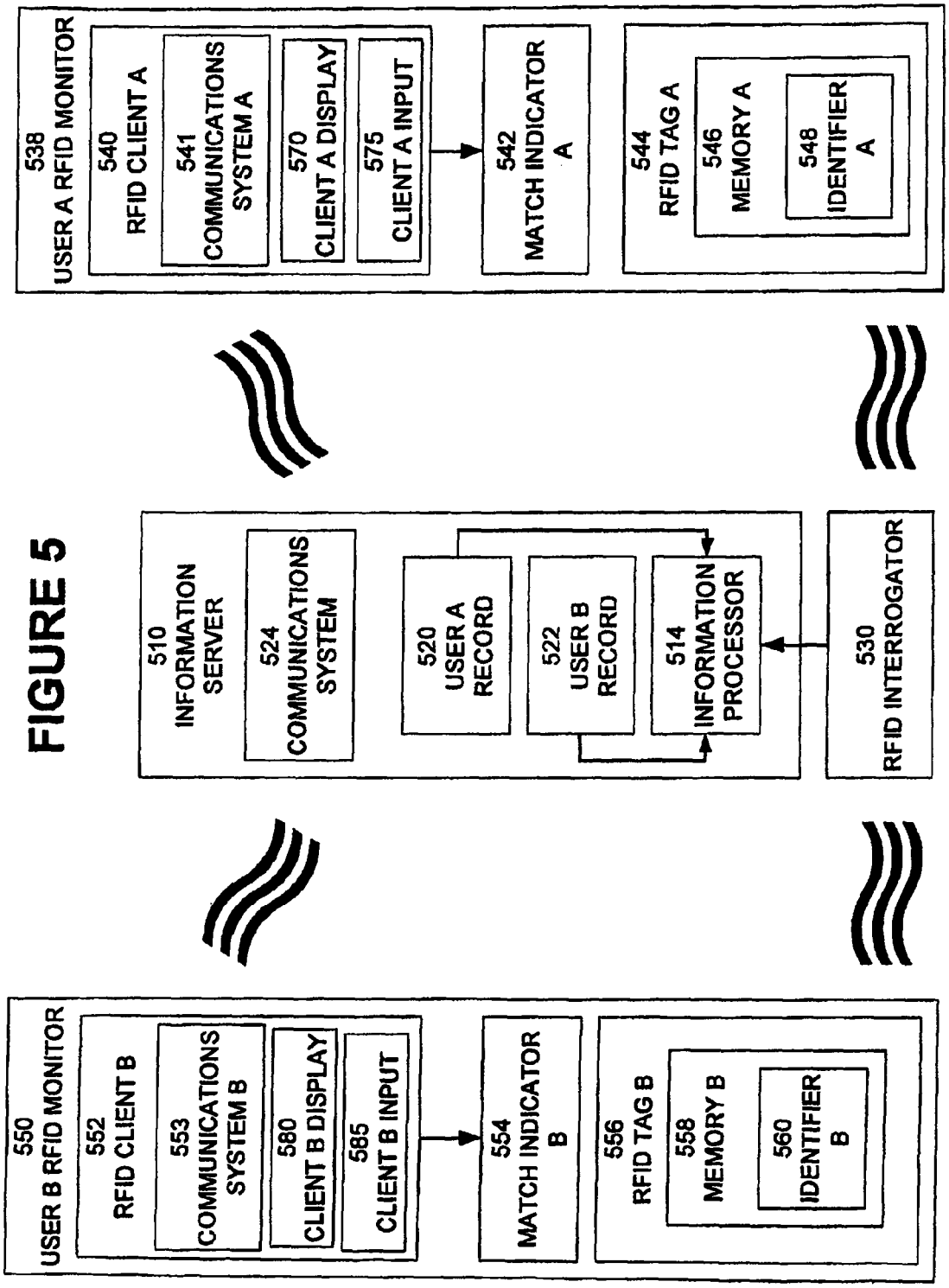
FIG. 5 illustrates the logical elements of an RFID-based matching system according to an embodiment hereof.
Figure 6:
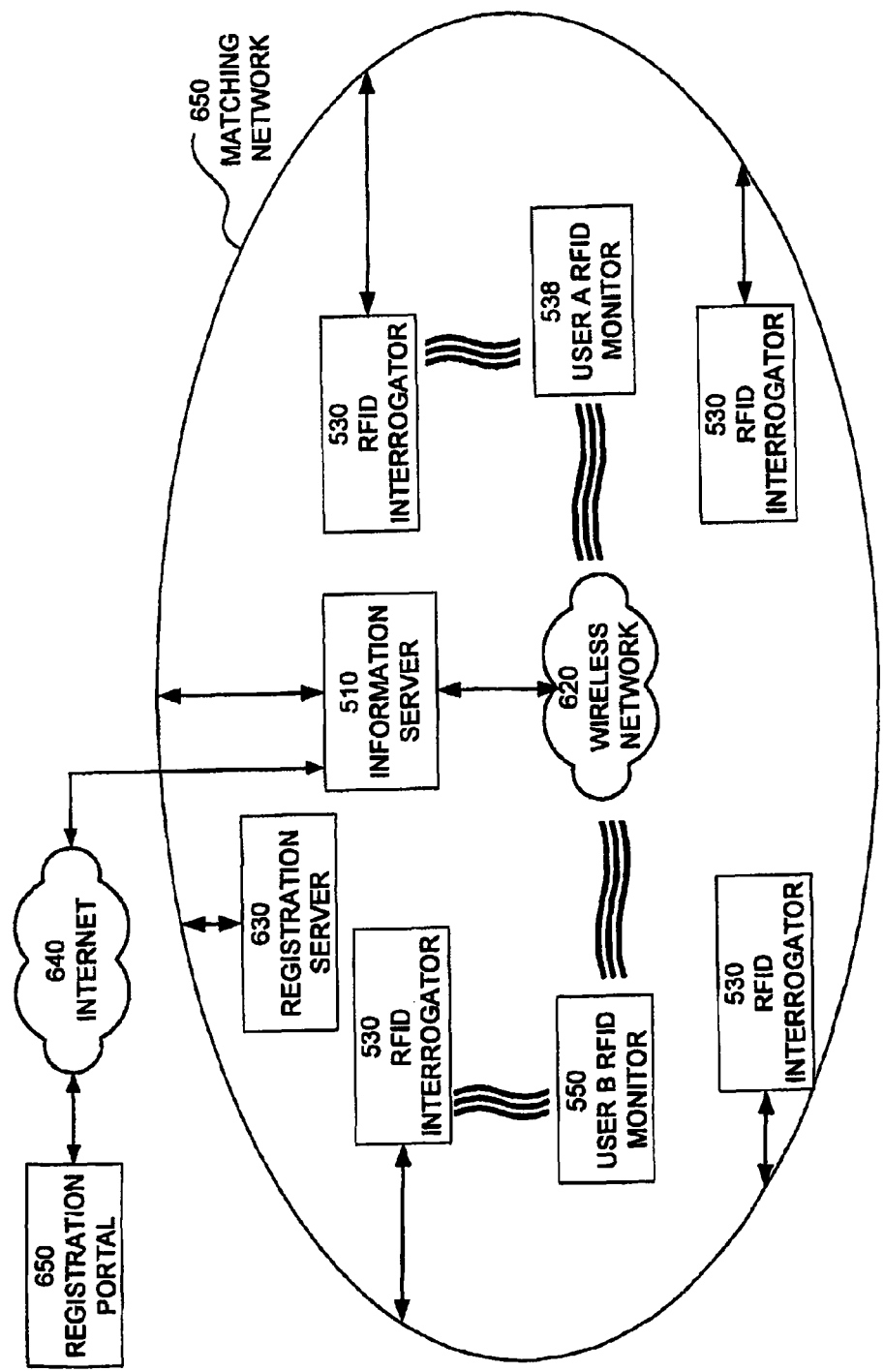
FIG. 6 illustrates the logical elements of a matching system using RFID tags according to an embodiment hereof.

The presence components of the system illustrated in FIG. 1 may be implemented using a variety of technologies. FIGS. 5 and 6 illustrate a matching system using RFID tags as the presence tags. Other technologies, such as Bluetooth, Wi-Fi, and a GPS system may be used alone or in combination with each other to provide this functionality. As noted above, various embodiments are not meant to be limited to these technologies. Other technologies may emerge in the future that provide a similar functionality. These are deemed to be within the scope of the embodiments noted herein. The client components may be custom device designed and built to provide the functions of the client or may be derived from other technologies such as cellphones, smart phones, wireless PDAs, and Bluetooth-compliant device and similar products that have been adapted to provide the client functions.

Figure 2:
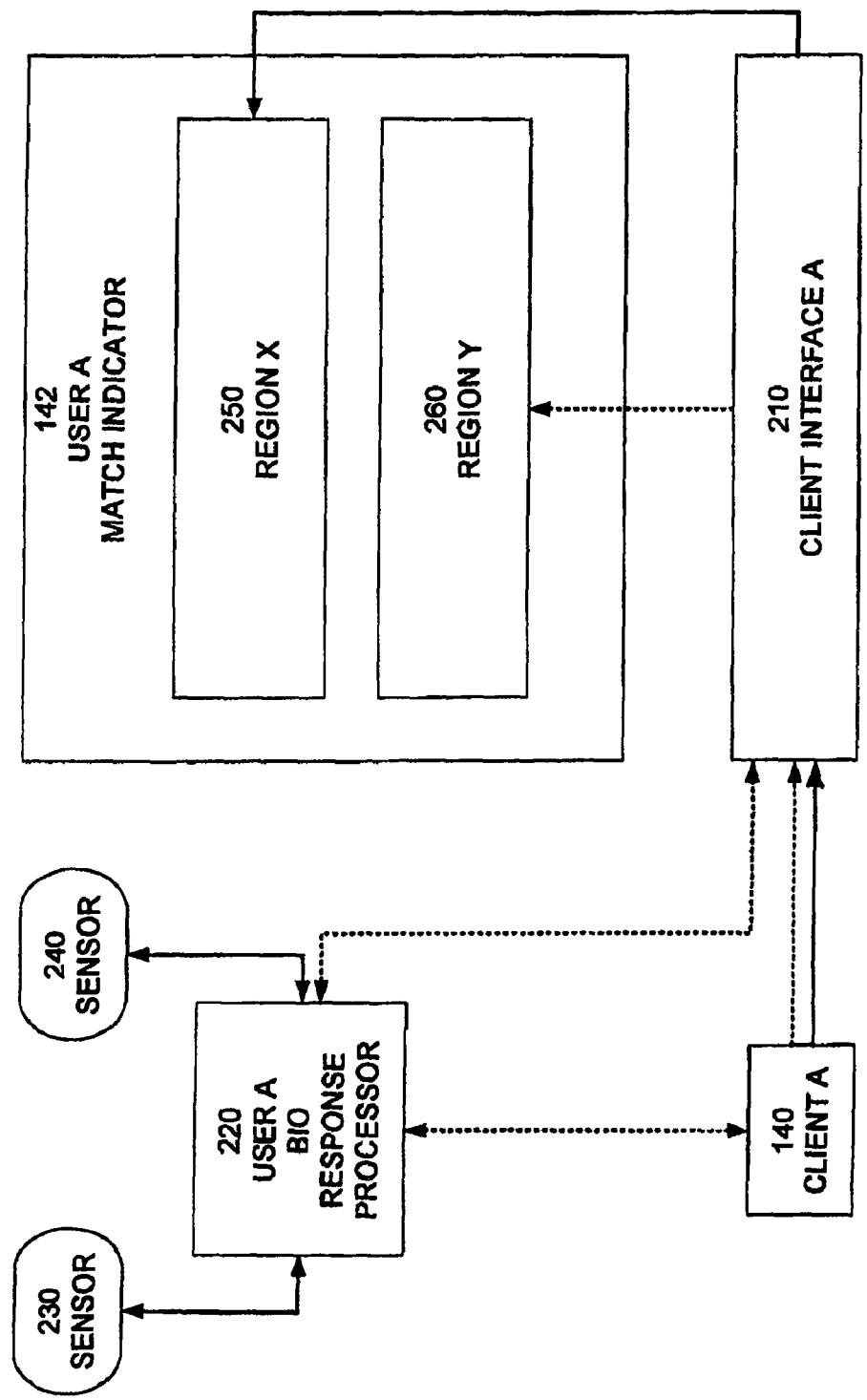
FIG. 2 illustrates a match indicator according to an embodiment hereof.

FIG. 2 illustrates a match indicator according to an embodiment. A match indicator A 142 is coupled to client A 140 via client interface A 210. Client A 140 processes a matching alert signal received from information processor 114 as described previously. The matching alert signal received by client A 140 comprises a display attribute of user B. The matching alert signal is passed by client A 140 to match indicator A 142 worn by user A. The match indicator A 142 is visible to user B (not illustrated) and displays the display attribute assigned to user B. User B wears a match indicator B 154 (see FIG. 1) that is visible to user A. When user A and user B come within proximity to each other, match indicators A and B (142 and 154 respectively, FIG. 1) display the display attribute assigned to user B and A respectively. The matching attribute may be a color, a symbol, a user identifier, or other indicator. In an embodiment, client B 152 "announces" the matching attribute of user A to user B and client A 140 announces the matching attribute of user B to user A. The announcement may be made by a text message or a synthesized voice message or other alerting means such as tactile indicators. In yet another embodiment, the language of the synthesized voice message may be selected by the user.

The match indicator 142 may be an LCD or other type of miniature display that is capable of interfacing with the client 140 to perform the functions described above and to be described below. The match indicator may be a discrete device or it may be integrated with any of the other functional elements of the matching system. In one embodiment, the match indicator is a flat screen that is worn by the user such as a badge, pin, pendant or bracelet. In another embodiment, the functions of the match indicator are performed by a screen of a cellphone or similar device that is carried in a holster and attached to a user so as to be visible to other users of the system.

In yet another embodiment, the match indicator is divided into at least two regions. As illustrated in FIG. 2, match indicator A 142 is divided into region X 250 and region Y 260. As previously described, the display attribute assigned to user B is displayed in region X 250 of the match indicator.

FIG. 2 also illustrates optional biological response processor A 220 and sensors 230 and 240. In an embodiment, the biological response processor A 220 receives physiological data from user A that is indicative of a level of attraction of user A to user B. The biological processor A 220 applies an attraction algorithm to the received physiological data to determine whether the level of attraction is positive or negative. The biological processor sends an "attraction signal" to the client A 140 or, alternatively, the client interface A 210. The attraction signal comprises an attraction attribute that is displayed in region Y 260. User B can thus not only determine the results of the application of the matching algorithm to the profiles of users A and B but can also monitor information about user A's response to user B in real time. Corresponding elements may be used to modify the matching attribute displayed on match indicator B 154. As previously described, the attributes displayed on match indicator A 142 can also be displayed on client B display 180.

By way of illustration and not as a limitation, physiological data may include heart rate, blood pressure, breathing rate, skin resistance, body temperature, voice pattern recognition, and brain electrical activity. The attraction algorithm may utilize these sensed data individually or in combination to produce the attraction signal.

In yet another embodiment, a sensor 230 comprises a microphone that detects the voice of user A. User A bio response processor 220 comprises a voice pattern recognition algorithm that determines whether user A is being truthful or otherwise indicates signs of stress when conversing with user B. User A bio response processor produces a truth/stress signal that comprises a truth/stress attribute this is displayed in region Y 260 of user A match indicator 142.

In an alternate embodiment, the sensor-microphone 230 worn by user A is configured to detect the voice of user B. User A bio response processor 220 produces a truth/stress signal that comprises an audio attribute that can be heard by user A or a display attribute that can be displayed on user A's client display 170 (see FIG. 1).

Figure 3:
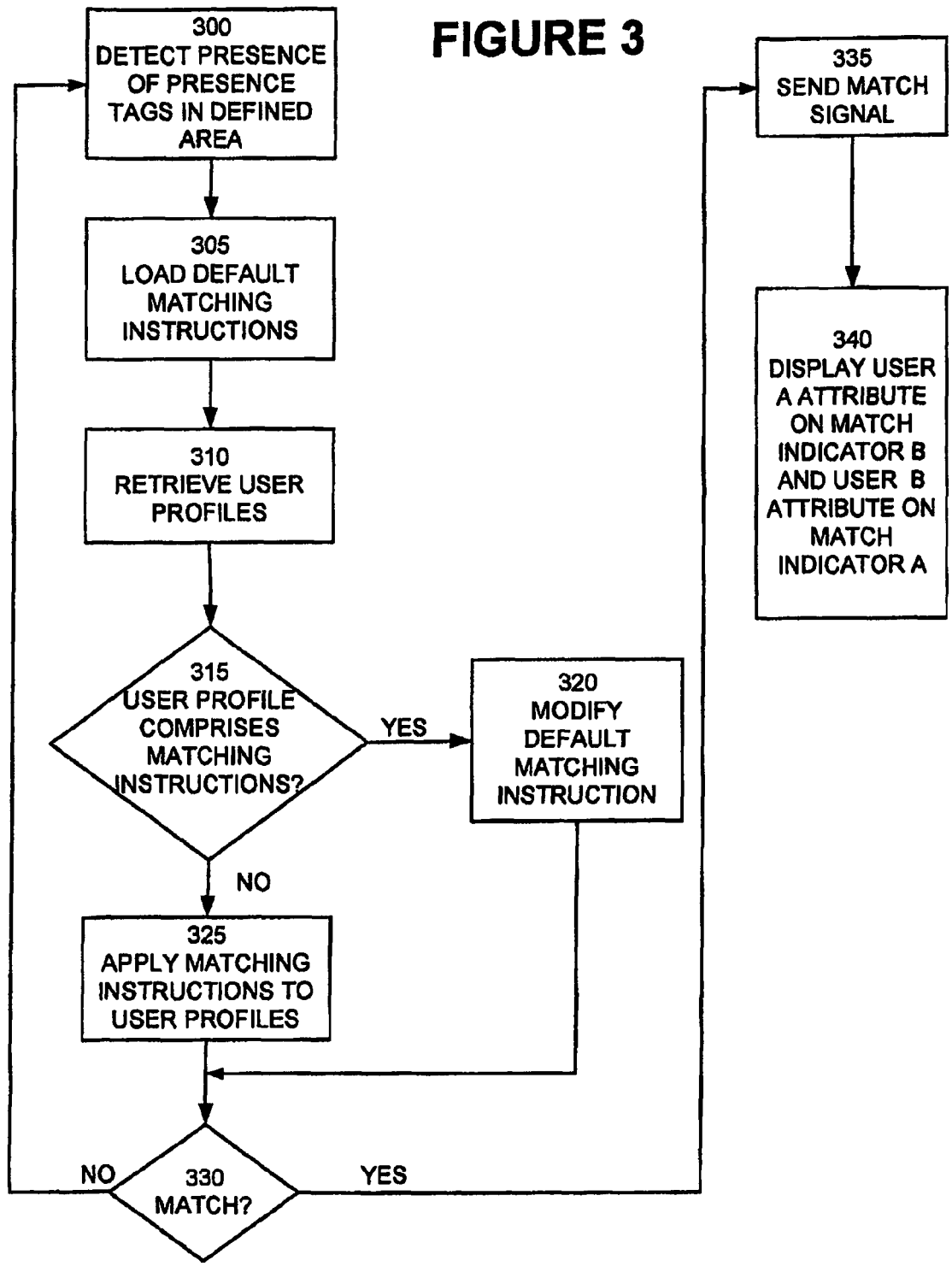
FIG. 3 illustrates a matching process according to an embodiment hereof.

FIG. 3 illustrates a matching process according to an embodiment. For ease of discussion and not as a limitation, the description that follows applies the matching process to a user A and a user B.

The presence tag identifiers that are within the defined space are obtained 300. In an embodiment, these identifiers are obtained by presence detectors at a preset interval. For this discussion, the "presence" identifiers include an identifier associated with a user A and an identifier associated with a user B. Default matching instructions are loaded into an information processor 305. Profiles of users A and B are retrieved 310. A determination is made whether the profile of a user comprises matching criteria 315. If no user matching criteria are found, the default matching instructions are applied 325 to the user profiles of users A and B. If one or more of the user profiles comprise matching criteria, the default matching instructions are modified to reflect the most restrictive user matching criteria 320.

A determination is made whether the profiles of user A and B "match" 330 according to the applied matching instructions. If a match is found, a match alert signal is sent 335 to the clients of the users for whom a match has been found and the system causes the attributes of the users to be displayed on the other user's indicator 340. Thereafter, the system awaits new polling data 300. If no matching profiles are found, the system awaits new polling data 300 and repeats the matching procedure.

The match alert signal comprises the display attribute assigned to the user to whom the match alert signal is directed.

By way of illustration and not as a limitation, if the profiles of users A and B are determined to match, then the match alert signal that is sent to user A comprises the display attribute that is assigned to user B. The match alert signal that is sent to user B comprises the display attribute that is assigned to user A. When user A and user B come within proximity to each other, match indicators A and B (see FIG. 1, 142 and 154 respectively) display the display attribute that has been previously assigned to the other user 340.

The match alert signal may further comprise audio information, video information, textual information, tactile or graphical information. Additionally, the match alert signal may provide location information of a user or provide directions to the location of a user. As previously described, the information in the match alert signal may be conveyed to the user via the user's client. The user may use the user input (see FIG. 1, 175 and 185) to request additional information from the information server 110 regarding the matching score and/or override the matching determination made by the information server 110.

In an embodiment, when new presence data is received, the matching procedure is only applied to newly arrived users.

Figure 4A:
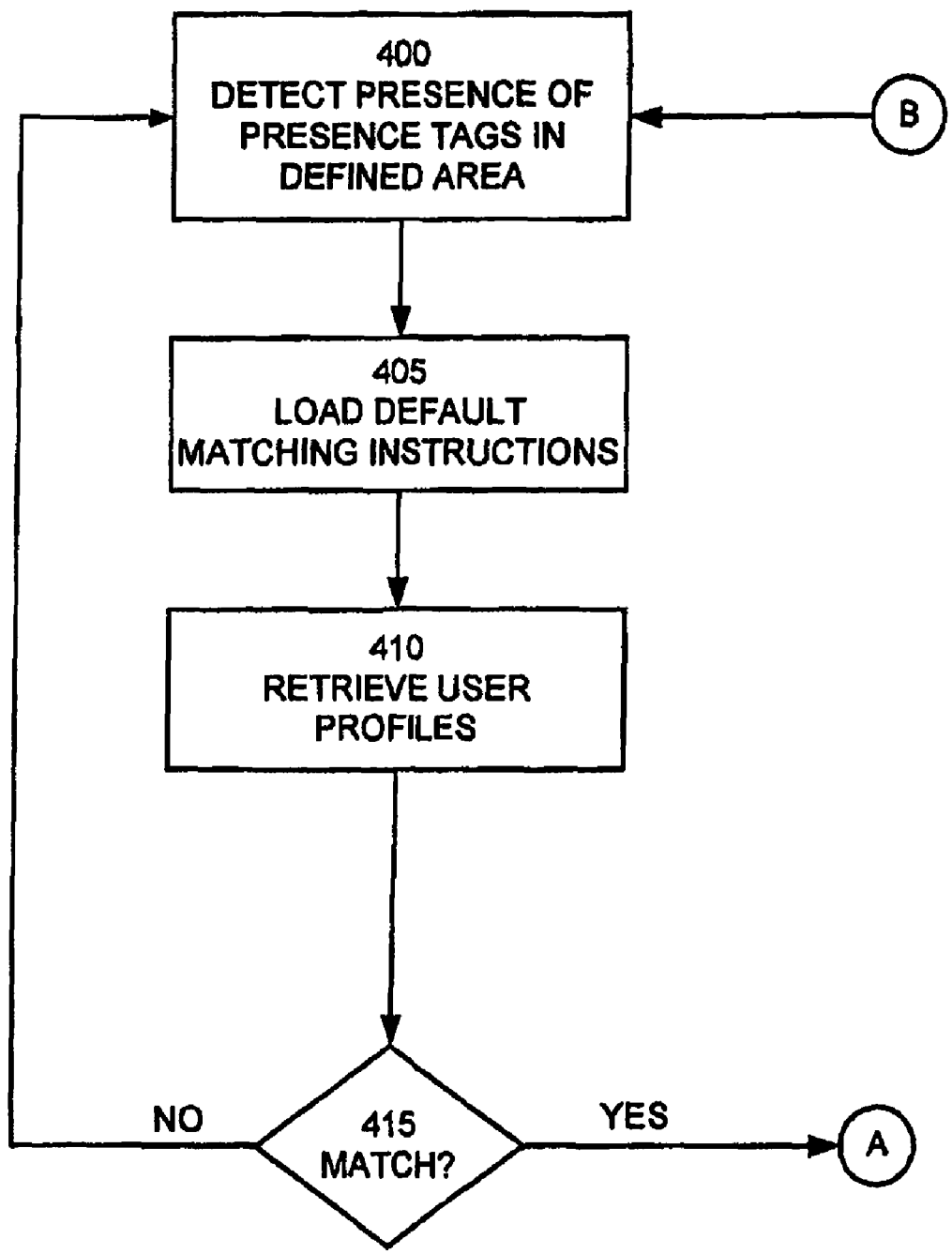

FIGS. 4A and 4B illustrate a matching process according to an embodiment. For ease of discussion and not as a limitation, the description that follows applies the matching process to a user A and a user B.

Referring to FIG. 4A, the presence identifiers that are within the defined space are obtained 400. In an embodiment, these identifiers are obtained by presence detectors at preset (but variable) time intervals. The "presence" identifiers include an identifier associated with a user A and an identifier associated with a user B. Default matching instructions are loaded into an information processor 405. Profiles of users A and B are retrieved 410. A determination is made whether the profiles of users A and B match based on a set of first matching criteria 415. If no matching profiles are found, the system awaits new polling data 400 and repeats the matching procedure.

If matching profiles are found, profile information is provided to the clients of the users for whom a match has been found 420. Referring to FIG. 4B, matching profiles have been found for users A and B. Profile information of user A is sent to the client of user B and the profile information of user B is sent to the client of user A 420.

User A applies user A matching instructions to the profile information of user B 425. If a match is determined according to the matching instructions of user A, user A uses client A to send a user A matching signal to an information processor 430. If there is no match according to the matching instructions of user A, the process ends 435.

User B applies user B matching instructions to the profile information of user A 440. If a match is determined according to the matching instructions of user B, user B uses client B to send a user B matching signal to an information processor 445. If there is no match according to the matching instructions of user A, the process ends 450.

A determination is made whether the information processor has received both the user A matching signal and the user B matching signal 460. If both user matching signals are received, the information processor conveys match alert signals to the respective clients of users A and B 465.

The match alert signal comprises the display attribute assigned to the user to whom the match alert signal is directed. By way of illustration and not as a limitation, a match alert signal that is sent to user A comprises the display attribute that is assigned to user B. The match alert signal that is sent to user B comprises the display attribute that is assigned to user A. When user A and user B come within proximity to each other, match indicators A and B (see FIGS. 1,142 and 154 respectively) display the display attribute that has been previously assigned to the other user 470.

If the information processor does not receive a match signal from both user A and user B, the system awaits new presence data 400 and repeats the matching procedure.

As will be appreciated by those skilled in the art, whether the matching process is performed sequentially or in batch is a matter of system optimization. In an embodiment, information processor 114 (FIG. 1) processes the profiles of all present users and stores the results before issuing matching alerts. In this mode, the matches may be ranked according to a matching score. The matching alerts may then be sent in order of ranking. Alternatively, a user may specify in the user profile the number of matches to be sent.

In an embodiment, a matching system is implemented at an event, such as a trade show, in which a large number of attendees pre-register. During the registration process, profile information is acquired from potential attendees. This profile information may be used to provide the potential attendee an initial indication of whether persons or vendors of interest will be in attendance at the event. Following registration but prior to the commencement of the event, the registered attendees may be pre-matched according to default matching instructions. Upon the commencement of the event, the presence of the registered attendees is determined. As attendees with matching profiles come into proximity with one another, matching alert signals are provided as appropriate to the attendees. In another embodiment, a determination is made whether a pre-registered attendee has modified his or her profile information since registering. If the profile has been modified, the matching process is re-run using the updated information. Additionally, the matching process is run on attendees who did not pre-register.

The behavior of the matching elements may vary depending on whether the profile information is associated with an individual representing a personal interest or an individual representing a commercial interest. For example, in the case of an event in which the primary objective is to introduce individuals for social purposes, it might be desirable to provide an individual control over the disclosure of their personal information, location, and contact information. In this application, an acknowledgement of a matching alert signal by both of the match users may be desirable prior to initiation of the exchange of information.

In the case where the objective is to match an individual with a product or product information, such as a booth at a trade show, the matching data may be sent to the user's client in real time without the need for an acknowledgment. For example, a user may be alerted when the user arrives at the trade show venue and alerted again when the user is in proximity to a display booth that matches the user's profile. The display booth may comprise multiple matching indicators to allow various attendees to determine whether the booth represents product information that is of interest to the attendee.

The applications to which a matching system incorporating a matching indicator may be directed are numerous. The distinction between them lies primarily in the types of data provided in the profile/preference data associated with the user clients and used to perform the matching process and the way in which the matching information is conveyed to users. The examples that follow assume that users are present within a defined space determined by the range of the presence detectors used to detect the presence of the presence tags (see FIG. 1, 130, 144 and 156).

In an exemplary application, a matching system operates in a shopping mall. Referring again to FIGS. 1 and 2, a user/shopper has created a profile on the information server 110 that is stored in user A record 120. The user/shopper may create his or her profile before arriving at the mall using a registration portal 650 (See FIG. 6), or the user/shopper may utilize a registration server 630 (see FIG. 6) operating at the mall. The user's profile comprises a shopping list of items that the user/shopper is interested in purchasing. In the application, user B record 122 comprises items that a merchant located within the mall desires to sell. For example, user B record 122 may be items that the merchant has on special or the entire inventory of the merchant. Information processor 114 operates matching instructions that determine if there is a match between the shopping list of the user/shopper and the items of the merchant.

The presence of the user/shopper within the mall is detected by a presence detector 130. If a match has been determined, a match alert signal is sent to the client A 140 of the user/shopper indicating that items of interest to the shopper may be located at a list of merchants. The match alert signal may, for example, identify the items on the shopping list of user/shopper that match the inventories of various merchants within the mall. The shopper proceeds to a merchant identified in the match alert signal.

A client B 152 and a match indicator B 154 are associated with items for sale at the merchant location. The location of the user/shopper within the mall is determined by reference to the location of the presence detector that is in receipt of the presence identifier 148 from presence tag A 144. The direction in which the user/shopper is walking can be determined by mapping the location of presence tag A 144 over time. Another match alert signal may be sent to the client B 152 when the user/shopper is in proximity to an item on the shopper's list. The match indicator B 154 then displays the display attribute assigned to the shopper. In this embodiment, the display attribute may comprise the shopper's name.

In another exemplary implementation, a matching system is operated in a social club in which individuals desiring to meet other individuals congregate. In this implementation, user A is associated with user A presence monitor 138 and user B is associated with user B presence monitor 150. Matching instructions are applied to the user profiles of user A and user B and a match is found. The match alert signal is passed by the client A 140 to a match indicator A 142 worn by user A. The match indicator A 142 is visible to user B. User B wears a match indicator B 154 that is visible to user A. When user A and user B come within proximity to each other, match indicators A and B (142 and 154 respectively) display a display attribute that has been previously assigned to the user. By way of illustration, user A may be assigned the symbol A in a red background and user B may be assigned the symbol B in a blue background. When user A and user B are in proximity to each other, the match indicator of user A would display a B in a blue background and the match indicator of user B would display an A in a red background. The intensity and/or hue of the background color may be varied to indicate the degree to which the profiles match. Additionally, when user A is in proximity to two potential matches, only the match indicator of the "best" match will display the display attribute of user A. Thus, in a defined space of many users, display indicators provide a visual cue of a level of commonality between individuals.

In a variation of this application, users not only wear a user monitor but a presence detector 130 as well. In this application, the presence detector communicates with information server 110 via a wireless link. By placing the presence detector on the user and controlling the polling signal strength and/or receiver sensitivity of the presence detector, the threshold proximity of users to each other before a matching alert signal is sent can be reduced. As a result, the match indicators would be triggered only when individuals are "next" to each other, allowing the match indicator to be highly targeted.

A matching system may be implemented using a variety of technologies. FIGS. 5 and 6 illustrate a matching system using RFID technology.

FIG. 5 illustrates the logical elements of a matching system according to an embodiment hereof. Referring to FIG. 5, an information server 510 comprises an information processor 514, a user A record 520 and a user B record 522. User A RFID monitor 538 comprises RFID tag A 544, RFID client A 540, communications system A 541, and match indicator A 542. RFID tag A 544 comprises memory 546 in which identifier A 548 is stored. Memory 546 may be read only or programmable read/write memory. User A is associated with identifier A 548 in user A record 520 in information server 510. Additionally, information server 510 comprises a communications system 524 for communicating with RFID clients A and B (540 and 552 respectively).

User B RFID monitor 550 comprises RFID tag B 556, RFID client B 552, communications system B 553, and match indicator B 554. RFID tag B 556 comprises memory B 558 in which identifier B 560 is stored. Memory 558 may be read only or programmable read/write memory. User B is associated with identifier B 560 in user B record 522 in information server 510.

In the embodiment illustrated in FIG. 5, RFID tags A and B (544 and 556 respectively) are passive devices. However, the present invention is not so limited. Semipassive or active RFID tags may be utilized for RFID tags A and B.

User records A and B (520 and 522 respectively) each comprise a user profile. By way of illustration and not as a limitation, a user profile comprises characteristic data and preference data. The characteristic data may include age, marital status, physical size, physical limitations, and similar personal information. Preference data, for example, may include information relevant to establishing a business relationship or a social relationship and information related to preferences in food, clothing, sports, entertainment, and music.

RFID interrogator 530 transmits a polling signal that is received by an RFID tag (such as 544 and 556) that is within range of the RFID interrogator 530. The RFID tag reflects the polling signal back to the RFID interrogator 530. The reflected signal comprises the RFID tag identifier of the responding RFID tag (such as 548 and 560). The RFID interrogator receives the reflected signal and sends the RFID tag identifier to information processor 514. Information processor 514 stores the location of the RFID interrogator 530 in association with the RFID tag identifier in the appropriate user record (such as 520 or 522).

The reflected signal may be further processed to determine a distance between an RFID tag and an RFID interrogator 530. In an embodiment, information processor 514 uses the signal strength of the reflected signal to determine a separation distance. The distance determination may be refined by varying the power of the query signal transmitted by RFID interrogator 530 and/or varying the sensitivity of the RFID interrogator 530 to the reflected signal. In this way, the accuracy of the location of a particular user relative to an array of RFID interrogators may be varied to suit a particular need.

The information server 510 communicates with RFID clients A and B (540 and 552 respectively) via links established between communications system A 541, communications system B 553, and communications system 524. By way of illustration and not as a limitation, an RFID client may be a standalone device or it may be communications devices such as a cellular phone, a pager, a personal data assistant, a transponder, a radio, a walkie-talkie, or a wireless Internet access device. RFID clients A and B (540 and 552 respectively) may also communicate with information server 510 to manage their respective user records, including the user profile. In an embodiment, RFID client 510 stores the user profile locally.

RFID client A further comprises a client A display 570 and a client A user input 575. RFID client B further comprises a client B display 580 and a client B user input 585. Client A display 570 and client B display 580 may display messages from information server 510. Client A user input 575 and client B user input 585 allow clients A and B respectively to compose queries and respond to queries from information server 510. By way of illustration and not as a limitation, client A user input 575 and client B user input 585 may be touch screens, key pads, pointing devices, thumbwheels or similar input devices.

In an embodiment, information processor 515 comprises a set of "default" instructions that determine how the profile information of user A and user B as reflected in user A record 520 and user B record 522 is to be related or "matched." For example, the default matching instructions may require that a match will be determined only if the age difference between user A and user B is ten years or less.

The default matching instructions may be modified by a preference setting in a user profile. For example, if user B's profile requires that the age difference not exceed two years, the default matching instructions will be modified to use the age criterion of user B's profile.

In an embodiment, a "match" between the profiles of user A and user B is quantitatively determined. In this embodiment, the default matching instructions produce a total matching score by assigning values to specific matching criteria. The default matching criteria and the weight assigned to a specific criterion may be modified by the user profile. If the matching score exceeds a threshold value, the matching score is communicated to users A and B through their respective RFID clients (540 and 552 respectively) via communications system 524.

In an embodiment, when a determination is made that the matching score of users A and B exceeds the threshold, a match alert signal is sent from the information server 510 to the RFID clients 540 and 552 of users A and B. As will be appreciated by those skilled in the art, the match alert signal may comprise audio information, video information, textual information, or graphical information. Additionally, the match alert signal may provide location information of a user or provide directions to the location of a user. The user may use the RFID client (such as 540 and 552) to request additional information from the information server 510 regarding the matching score and/or override the matching determination made by the information server 510.

In an embodiment, the match alert signal is passed by the RFID client A 540 to a match indicator A 542 worn by user A. The match indicator A 542 is visible to user B. User B wears a match indicator B 554 that is visible to user A. When user A and user B come within proximity to each other, match indicators A and B (542 and 554 respectively) display the matching attribute. The matching attribute may be a color, a symbol, a user identifier, or other indicator. In an embodiment, RFID client 540 "announces" the matching attribute of user A to user B and the matching attribute of user B to user A. The announcement may be made by a text message or a synthesized voice message or other type of alerting stimuli. In yet another embodiment, the language of the synthesized voice message maybe selected by the user.

In an embodiment, the information server also tracks the matching attribute assigned to users located in an area of the defined space to minimize duplication of the matching attribute.

In another embodiment, the user profile and user matching instructions are stored in the RFID client 540. User matching instructions are configured by the user to meet specific requirements of that user. The information server 510 determines that users A and B are within a defined space and uses the default matching instructions to determine whether the profiles of users A and B match based on a set of first matching criteria. If the profiles match according to these criteria, the profile of user A is sent to the RFID client 552 of user B and the profile of user B is sent to the RFID client 540 of user A. User A applies user A matching instructions to the profile of user B. If a match is determined according to the matching instructions of user A, user A uses RFID client A 540 to send a user A matching signal to information processor 514. If a match is determined according to the matching instructions of user B, user B uses RFID client B 552 to send a user B matching signal to information processor 514.

If information processor 514 receives both the user A matching signal and the user B matching signal, the information processor 514 facilitates a meeting between user A and user B by providing location and/or contact information.

Alternatively, if information processor 514 receives both the user A matching signal and the user B matching signal, the information processor 514 sends only contact information to the users. The users then communicate further without the assistance of the information server.

FIG. 6 illustrates an RFID-based matching system (RMS) configured for a defined space. By way of illustration and not as a limitation, a defined space may include a convention hall, a sports arena, a bar, country club, a shopping mall, an area within a city such as a shopping or commercial district or other place where people of similar interests gather.

Users of the RMS are assigned a user RFID monitor. In FIG. 6, user RFID monitor A 538 and user RFID monitor B 550 are illustrated. However, this is not meant to be a limitation. It is anticipated that many users of the RMS will be in the defined space simultaneously with each assigned a user RFID monitor.

RFID interrogators 530 are situated within the defined space and keep track of the locations of each of the RFID tags. The RFID interrogators communicate with the information server 510 via matching network 610 and with user RFID monitors A and B via wireless network 605. Because the location of RFID interrogators is known, the relative movement of a user can be tracked and the location of the user approximated. This information can be provided to another user via the user RFID monitor.

In an embodiment, information server 510 is accessible to users of the RMS through a registration server 630 and through a registration portal 650 via Internet 640. Users of the RMS system may register with the information server 510, create and/or update the user record, and modify the user profile maintained on information server 510 through these access points. For example, the registration server 630 may be in a kiosk within a shopping mall or at a registration desk for a conference. In addition, a user may access information server 510 from the RFID client associated with the user.

It will also be understood that the invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the," is not to be construed as limiting the element to the singular.

The invention claimed is:

1. A portable matching device comprising:
a memory storing first identification information;
a communication device configured to transmit the first identification information from the memory to a presence detector and to receive a matching attribute from a server configured to determine whether a first profile associated with the first identification information and a second profile match according to matching criteria;
a match indicator configured to present the matching attribute, wherein the matching attribute is unique to the second profile and at least one of outwardly visible or audible so as to be informative to a person other than a user of the portable matching device of the match.

2. The portable matching device of claim 1 wherein the matching attribute comprises a quantitative measure so as to be informative of a degree to which the first and second profiles match according to the matching criteria.

3. The portable matching device of claim 1 further comprising:
a sensor responsive to physiological data; and
a computing system configured to:
receive the physiological data from the sensor;
determine a measure of attraction from at least one element of the physiological data; and
create an attraction attribute indicative of the measure of attraction.

4. The portable matching device of claim 1 further comprising:
a sensor responsive to physiological data; and
a computing system configured to:
receive the physiological data from the sensor;
determine a measure of truthfulness from at least one element of the physiological data; and
create a truthfulness attribute indicative of the measure of truthfulness.

5. The portable matching device of claim 1 wherein the communication device is configured to receive directions from a location of the portable matching device to a second portable matching device associated with the second profile; and
wherein the output is configured to present the directions to the user of the portable matching device.

6. The portable matching device of claim 1 wherein the memory stores the first profile; and
wherein the communication device is further configured to transmit the first profile to the server.

7. The portable matching device of claim 1 wherein the match indicator comprises at least one of a display or a speaker.

8. A method for presenting a match alert, the method comprising:
storing first identification information in a memory of a portable matching device;
transmitting the first identification information to a computing system that stores a first profile associated with the portable matching device;
receiving a matching attribute from the computing system, the matching attribute indicating that the first profile matches a second profile according to matching criteria;
presenting the matching attribute on a match indicator of the portable matching device, wherein the matching attribute is unique to the second profile and at least one of outwardly visible or audible so as to be informative to a person other than a user of the portable matching device of the match.

9. The method of claim 8 wherein presenting the matching attribute comprises presenting a matching attribute as a quantitative measure so as to be informative of a degree to which the first and second profiles match according to the matching criteria.

10. The method of claim 8 further comprising:
receiving physiological data from a sensor;
determining a measure of attraction from at least one element of the physiological data; and
creating an attraction attribute indicative of the measure of attraction.

11. The method of claim 8 further comprising:
receiving physiological data from a sensor; and
a computing device determining a measure of truthfulness from at least one element of the physiological data; and
the computing device creating a truthfulness attribute indicative of the measure of truthfulness.

12. The method of claim 8 further comprising:
receiving directions from a location of the portable matching device to a second portable matching device associated with the second profile; and
presenting the directions to the user of the portable matching device.

13. The method of claim 8 further comprising:
storing the first profile in the memory; and
transmitting the first profile to the computing system.

14. The method of claim 8 wherein presenting the matching attribute on a match indicator of the portable matching device comprises presenting the matching attribute on at least one of a display or a speaker of the portable matching device.

15. A tangible computer-readable medium having instructions stored thereon, the instructions comprising:
instructions to transmit first identification information to a presence detector;
instructions to receive a matching attribute from a server configured to determine whether a first profile associated with the first identification information and a second profile match according to matching criteria;
instructions to present the matching attribute, wherein the matching attribute is unique to the second profile and at least one of outwardly visible or audible so as to be informative of the match.

16. The tangible computer-readable medium of claim 15 wherein the matching attribute comprises a quantitative measure so as to be informative of a degree to which the first and second profiles match according to the matching criteria.

17. The tangible computer-readable medium of claim 15, the instructions further comprising:
instructions to receive physiological data from a sensor;
instructions to determine a measure of attraction from at least one element of the physiological data; and
instructions to create an attraction attribute indicative of the measure of attraction.

18. The tangible computer-readable medium of claim 15, the instructions further comprising:
instructions to receive physiological data from a sensor; and
instructions to configure a computing system to:
determine a measure of truthfulness from at least one element of the physiological data; and create a truthfulness attribute indicative of the measure of truthfulness.

19. The tangible computer readable medium of claim 15, the instructions further comprising:

instructions to receive directions from a location of the portable matching device to a second portable matching device associated with the second profile; and instructions to present the directions to the user of the portable matching device.

20. The tangible computer readable medium of claim 15, the instructions further comprising:

instructions to store the first profile; and instructions to transmit the first profile to the server.

* * * * *